US010666616B2

(12) United States Patent
Li et al.

(10) Patent No.: US 10,666,616 B2
(45) Date of Patent: May 26, 2020

(54) APPLICATION IDENTIFICATION AND CONTROL IN A NETWORK DEVICE

(71) Applicant: CA, Inc., San Jose, CA (US)

(72) Inventors: Qing Li, Cupertino, CA (US); Joseph H. Chen, Manhattan Beach, CA (US); Qu Bo Song, Singapore (SG); Ying Li, Jinzhou (CN); Zhicheng Zeng, Chengdu (CN); Jiang Dong, Chengdu (CN)

(73) Assignee: CA, Inc., San Jose, CA (US)

( * ) Notice: Subject to any disclaimer, the term of this patent is extended or adjusted under 35 U.S.C. 154(b) by 255 days.

(21) Appl. No.: 15/799,032

(22) Filed: Oct. 31, 2017

(65) Prior Publication Data
US 2019/0132288 A1    May 2, 2019

(51) Int. Cl.
*H04L 29/06*    (2006.01)
*H04L 12/46*    (2006.01)
*H04L 12/26*    (2006.01)

(52) U.S. Cl.
CPC ...... *H04L 63/0245* (2013.01); *H04L 12/4633* (2013.01); *H04L 12/4641* (2013.01); *H04L 43/00* (2013.01); *H04L 63/029* (2013.01); *H04L 63/0272* (2013.01); *H04L 69/16* (2013.01); *H04L 69/22* (2013.01)

(58) Field of Classification Search
None
See application file for complete search history.

(56) References Cited

U.S. PATENT DOCUMENTS

| 2002/0059424 | A1  | 5/2002 | Ferguson et al. |
| 2004/0098485 | A1  | 5/2004 | Larson et al. |
| 2009/0037976 | A1  | 2/2009 | Teo et al. |
| 2010/0002693 | A1* | 1/2010 | Rao ............... H04L 12/2856 370/389 |

(Continued)

OTHER PUBLICATIONS

Amrien, Severin; "Does your phone spy on you?"; Master Thesis; 2016; located at: https://pub.tik.ee.ethz.ch/students/2016-FS/MA-2016-47.pdf; 52 pages. (Year: 2016).*

(Continued)

*Primary Examiner* — Andrew J Steinle
(74) *Attorney, Agent, or Firm* — Maschoff Brennan (57) ABSTRACT

Application identification and control in a network device. In one embodiment, a method may include establishing, at a network device, a Virtual Private Network (VPN) tunnel through which all Transmission Control Protocol (TCP) and User Datagram Protocol (UDP) traffic sent from or received at the network device is routed. The method may also include monitoring, at the network device, all TCP and UDP traffic sent from or received at the network device through the VPN tunnel. The method may further include extracting, at the network device, payload data from the monitored TCP and UDP traffic. The method may also include analyzing the extracted payload data to identify applications executing on the network device that sent or received the monitored TCP and UDP traffic. The method may further include taking, at the network device, a security action on the network device based on the identified applications.

20 Claims, 3 Drawing Sheets

(56) References Cited

U.S. PATENT DOCUMENTS

2010/0023788 A1* 1/2010 Scott ................... G06F 1/3209
 713/320
2016/0219024 A1 7/2016 Verzun et al.
2016/0337104 A1* 11/2016 Kalligudd ............ H04W 76/10

OTHER PUBLICATIONS

International Search Report and Written Opinion issued in PCT Application No. PCT/US18/52727 dated Dec. 6, 2018, 12 pages.
Amrien, Severin; "Does your phone spy on you?"; Master Thesis; 2016; located at: https://pub.tik.ee.ethz.ch/students/2016-FS/MA-2016-47.pdf; 52 pages.
U.S. Appl. No. 15/465,636 titled "Systems and Methods for Enforcing Dynamic Network Security Policies", filed Mar. 22, 2017, 69 pages.
U.S. Appl. No. 15/228,885 titled "Application Classification and Management", filed Aug. 4, 2016, 37 pages.
U.S. Appl. No. 15/345,533 titled "Selective Traffic Blockage", filed Nov. 8, 2016, 47 pages.

* cited by examiner

APPLICATION IDENTIFICATION AND CONTROL IN A NETWORK DEVICE

BACKGROUND

Network devices typically execute a variety of applications that communicate over a network with other network devices or network servers. In certain situations it may be desirable to identify each of the applications executing on a network device that is sending or receiving network traffic. For example, the identification of the executing applications may enable the network traffic to or from these applications to be controlled, depending on the known behavior of a particular application. Unfortunately, however, it can be difficult to determine which applications are currently executing on a network device, which makes application-specific control of network traffic difficult or impossible.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for application identification and control in a network device may be performed, at least in part, by a computing device including at least one processor. The method may include establishing, at a network device, a Virtual Private Network (VPN) tunnel through which all Transmission Control Protocol (TCP) and User Datagram Protocol (UDP) traffic sent from or received at the network device is routed. The method may also include monitoring, at the network device, all TCP and UDP traffic sent from or received at the network device through the VPN tunnel. The method may further include extracting, at the network device, payload data from the monitored TCP and UDP traffic. The method may also include analyzing the extracted payload data to identify applications executing on the network device that sent or received the monitored TCP and UDP traffic. The method may further include taking, at the network device, a security action on the network device based on the identified applications.

In some embodiments, the analyzing of the extracted payload data may include sending, from the network device, and receiving, at a network server, the extracted payload data, analyzing, at the network server, the extracted payload data to identify the applications executing on the network device that sent or received the monitored TCP and UDP traffic, and sending, from the network server, and receiving, at the network device, an indication of the identified applications. In these embodiments, the establishing, monitoring, extracting, and taking may be performed at the network device by a first security application executing on the network device and the analyzing may be performed at the network server by a second security application executing on the network server. Also, in these embodiments, the performing of the analyzing by the second security application executing on the network server may reduce power consumption at the network device. Further, in these embodiments, the network device may be a cellular device, the network server may be operated by a carrier of a cellular network utilized by the cellular device, and the performing of the analyzing by the second security application may occur whenever the cellular device is connected to the cellular network.

In some embodiments, the analyzing of the extracted payload data may be performed at the network device by a security application executing on the network device. In some embodiments, the establishing, at the network device, of the VPN tunnel may be performed by a security application executing on the network device using a standard VPN Application Programming Interface (API) of an operating system executing on the network device. In these embodiments, the operating system may be a closed operating system and the standard VPN API may be an NEPacketTunnelProvider VPN API. Also, in these embodiments, the operating system may be a closed operating system.

In some embodiments, the monitoring and extracting may be performed at the network device without awareness by the identified applications executing on the network device, without modification of the monitored TCP and UDP traffic, and without rerouting the monitored TCP and UDP traffic through another device. In some embodiments, the taking, at the network device, of the security action may include one or more of restricting TCP and UDP traffic sent from or received at one or more of the identified applications at the network device and enforcing a security policy on one or more of the identified applications at the network device. In some embodiments, the identifying of the applications executing on the network device may include classifying the applications as including one or more of: a spyware, a virus, a malware, a worm, a logic bomb, a trapdoor, a Trojan horse, a Remote Admin Trojan (RAT), a malware, a ransomware, a mobile malicious code, a malicious font, and a rootkit. In some embodiments, this classifying may be performed using fuzzy matching.

Also, in some embodiments, one or more non-transitory computer-readable media may include one or more computer-readable instructions that, when executed by one or more processors, cause the one or more processors to perform a method for application identification and control in a network device.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Network devices typically execute a variety of applications that communicate over a network with other network devices or network servers. For example, a smartphone may execute a variety of applications (also referred to as apps) that each communicates over a network with other network devices, such as other smartphones, or network servers, such as webservers. In certain situations it may be desirable to identify each of the applications executing on the smartphone that is sending or receiving Internet Protocol (IP) traffic, such as Transmission Control Protocol (TCP) and User Datagram Protocol (UDP) traffic, to enable the TCP and UDP traffic to be controlled, depending on the known behavior of a particular application. For example, where an application executing on a smartphone is identified as a malware application, the TCP and UDP traffic of the malware application may be restricted. Similarly, where the application executing on a smartphone is identified as a file-sharing application that is subject to a security policy to avoid the uploading of confidential files to a file-sharing server, the security policy may be enforced on the file-sharing application. Unfortunately, however, it can be difficult to determine which applications are currently executing on a network device, which makes application-specific control of network traffic difficult or impossible.

Some embodiments disclosed herein may enable application identification and control in a network device. In particular, some embodiments may establish a Virtual Private Network (VPN) tunnel at a network device through which all TCP and UDP traffic sent from or received at the network device is routed. All TCP and UDP traffic sent from or received at the network device through the VPN tunnel may then be monitored and analyzed to identify applications executing on the network device that sent or received the monitored TCP and UDP traffic. Once the applications executing on the network device are identified, a security action may be taken on the network device based on the identified applications.

For example, a VPN tunnel may be established on a smartphone in order to monitor and analyze all TCP and UDP traffic sent from or received at applications executing on the smartphone. This analyzing may result in the identification of the applications executing on the smartphone, which may enable a security action that may be taken on the smartphone based on the identified applications, such as restricting the TCP and UDP traffic of a malware application or enforcing a security policy on the TCP and UDP traffic of a file-sharing application.

The embodiments disclosed herein may enable monitoring and analyzing of TCP and UDP traffic to identify applications executing on the network device without awareness by the executing applications, without modification of the monitored TCP and UDP traffic, and without rerouting the monitored TCP and UDP traffic through another device. Therefore, the embodiments disclosed herein may enable application-specific control of TCP and UDP traffic on the network device.

Figure 1:
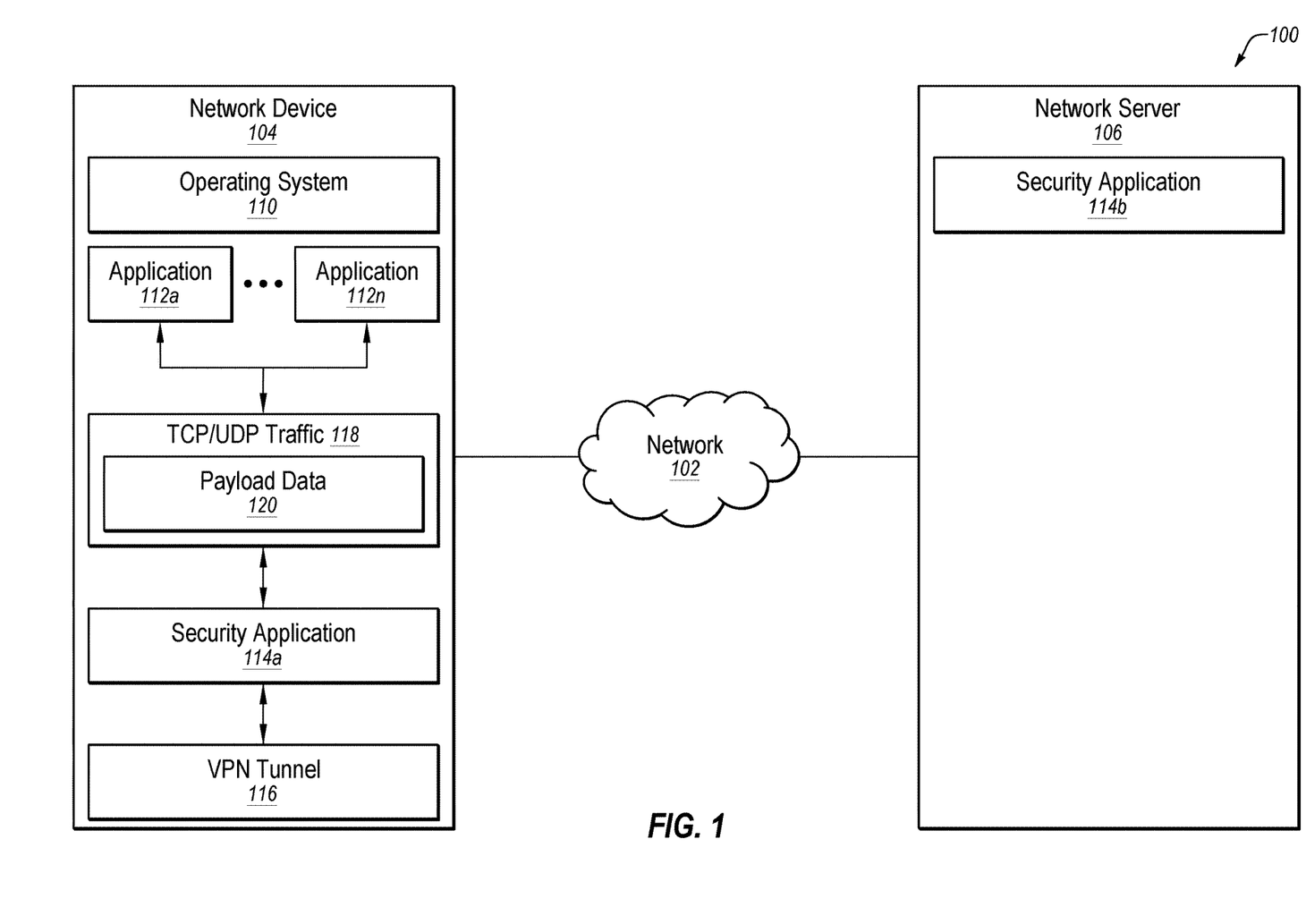
FIG. 1 illustrates an example system configured for application identification and control in a network device.

Turning to the figures, FIG. 1 illustrates an example system 100 configured for application identification and control in a network device. The system 100 may include a network 102, a network device 104, and a network server 106.

In some embodiments, the network 102 may be configured to communicatively couple the network device 104 to the network server 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
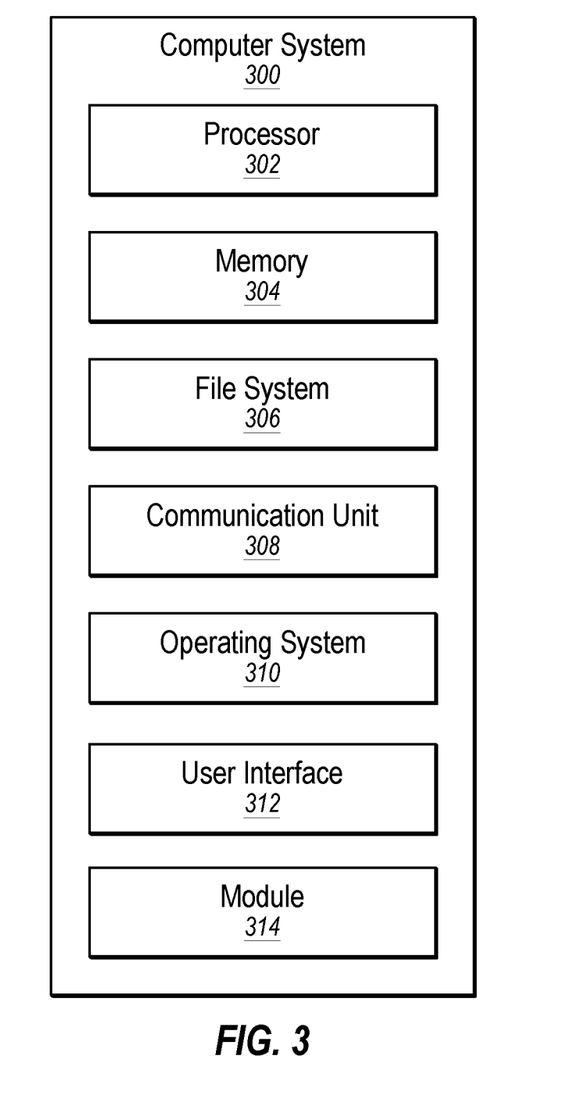
FIG. 3 illustrates an example computer system that may be employed in application identification and control in a network device.

In some embodiments, the network device 104 may be any computer system capable of communicating over the network 102, examples of which are disclosed herein in connection with the computer system 300 of FIG. 3. The network device 104 may include an operating system 110, applications 112a-112n, and a security application 114a that may be configured to identify and control the applications 112a-112n executing on the network device 104. In some embodiments, the security application 114a may include, or be part of, a network security application, such as Symantec's Norton Mobile Security application.

In some embodiments, the network server 106 may be any computer system capable of communicating over the network 102 and capable of monitoring the network device 104, examples of which are disclosed herein in connection with the computer system 300 of FIG. 3. In some embodiments, the network server 106 may be employed by an organization that manages the network 102 and/or the network device 104, or that needs to control network traffic on the network device 104, such as an employer who allows an employee to use a person network device on the employer's network. In some embodiments, the network server 106 may include a security application 114b that may be configured to identify and/or control the applications 112a-112n executing on the network device 104. In some embodiments, the security application 114b may include, or be part of, a network security application, such as Symantec's Norton Mobile Security application.

In some embodiments, the security application 114a may enable application identification and control in the network device 104. In particular, the security application 114a may establish a VPN tunnel 116 at the network device 104 through which all TCP and UDP traffic 118 sent from or received at the applications 112a-112n of network device 104 is routed. As the TCP and UDP traffic 118 is routed through the VPN tunnel 116, the security application 114a may monitor the TCP and UDP traffic 118 and extract payload data 120 from the monitored TCP and UDP traffic 118. The security application 114a and/or the security application 114b may then analyze the extracted payload data 120 to identify the applications 112a-112n executing on the network device 104 that sent or received the monitored TCP and UDP traffic 118. The security application 114a and/or the security application 114b may then take a security action on the network device 104 based on the identified applications 112a-112n. The functionalities of the security application 114a and the security application 114b are disclosed in greater detail in connection with FIG. 2 herein.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
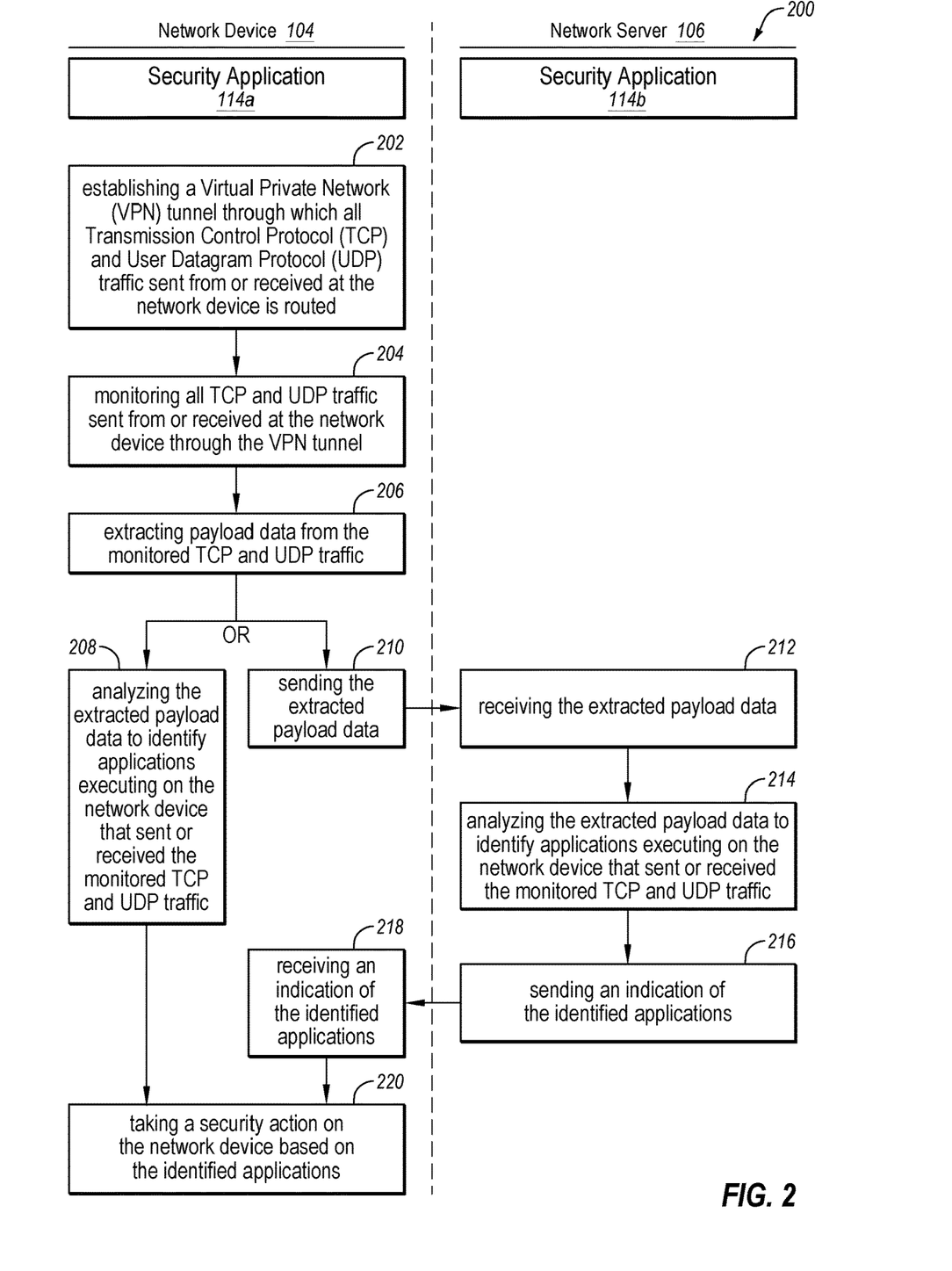
FIG. 2 is a flowchart of an example method for application identification and control in a network device.

FIG. 2 is a flowchart of an example method 200 for application identification and control in a network device. The method 200 may be performed, in some embodiments, by a device or system, such as by the security application 114a executing on the network device 104 and/or the security application 114a executing on the network server 106 of FIG. 1. In these and other embodiments, the method 200 may be performed by one or more processors based on one or more computer-readable instructions stored on one or more non-transitory computer-readable media. The method 200 will now be described in connection with FIGS. 1 and 2.

The method 200 may include, at block 202, establishing, at a network device, a Virtual Private Network (VPN) tunnel through which all Transmission Control Protocol (TCP) and User Datagram Protocol (UDP) traffic sent from or received at the network device is routed. In some embodiments, the establishing, at the network device, of the VPN tunnel may be performed using a standard VPN Application Programming Interface (API) of an operating system, such as a closed operating system, executing on the network device. For example, the security application 114a may establish at the network device 104, at block 202, the VPN tunnel 116 through which all of the TCP and UDP traffic 118 sent from or received at the network device 104 is routed. In this example, the security application 114a may establish the VPN tunnel 116 using a standard VPN API of the operating system 110 (also known as a Standard Development Kit (SDK) API), such as an NEPacketTunnelProvider VPN API of a closed IOS® operating system. In general, a closed operating system (also known as a closed source operating system), such as an IOS® operating system or a WINDOWS® operating system, uses code that is proprietary and kept secret to prevent its use by other entities, with only limited APIs made accessible to third party software developers. In contrast, an open operating system (also known as an open-source operating system), such as a Linux operating system, uses code that is freely-distributed and available for use by third party software developers. In some embodiments, establishing the VPN tunnel 116 using a standard VPN API of the operating system 110 may result in advantages to the security application 114a. For example, where the operating system 110 is an IOS® operating system, which may enforce TLS 1.2, establishing the VPN tunnel 116 using a standard VPN API of the operating system 110, in order to eventually to identify the applications 112a-112n at block 208 or block 214 as discussed below, may result in the security application 114a being approved to be available in, and downloaded from, the "APPLE® App Store" and without jailbreaking the network device 104, which would generally not be allowed if the security application 114a was instead configured to identify the applications 112a-112n using an undocumented or private API. Further, in some embodiments, the establishing, at block 202, of a VPN tunnel 116 by the security application 114a allows the security application 114a to function as an on-device "proxy" (or an on-device trusted Man In The Middle (MITM), or an on-device system level extension) that can intercept and inspect all Internet Protocol (IP) Layer traffic, including the TCP and UDP traffic 118, sent from or received at the network device 104. This on-device "proxy" may intercept each raw TCP packet and each raw UDP packet in the TCP and UDP traffic 118 and simulate a protocol stack, such as an IPv4 protocol stack or an IPv6 protocol stack, that includes a simulated TCP stack and a simulated UDP stack. This on-device "proxy" may then establish TCP "proxy" sockets and UDP "proxy" sockets over which the corresponding TCP packets and UDP packets are sent and received. These details may be hidden from the applications 112a-112n, however, resulting in each of the applications 112a-112n believing it is still connecting directly to the network 102 through its own socket. The TCP and UDP "proxy" sockets can be established to the original destinations (the original target servers) directly. As a result the TCP and UDP "proxied" packets will go directly from the network device to the intended destinations, without being rerouted to any third-party remote VPN server, which eliminates any need for, and the setup costs and privacy concerns associated with, routing TCP and UDP packets through third-party remote VPN servers.

The method 200 may include, at block 204, monitoring, at the network device, all TCP and UDP traffic sent from or received at the network device through the VPN tunnel. For example, the security application 114a may monitor at the network device 104, at block 204, all the TCP and UDP traffic 118 sent from or received at the network device 104 through the VPN tunnel 116.

The method 200 may include, at block 206, extracting, at the network device, payload data from the monitored TCP and UDP traffic. For example, the security application 114a may extract at the network device 104, at block 206, the payload data 120 from the monitored TCP and UDP traffic 118. In some embodiments, the payload data 120 may only be extracted from a selective portion of the TCP and UDP traffic 118, such as from the first and second packets in a sequence of packets.

The method 200 may include block 208. Alternatively to or in addition to block 208, the method 200 may include blocks 210-218.

The method 200 may include, at block 208, analyzing, at the network device, the extracted payload data to identify applications executing on the network device that sent or received the monitored TCP and UDP traffic. For example, the security application 114a may analyze at the network device 104, at block 208, the extracted payload data 120 to identify the applications 112a-112n executing on the network device 104 that sent or received the monitored TCP and UDP traffic 118.

The method 200 may include, at blocks 210 and 212, sending, from the network device, and receiving, at the network server, the extracted payload data. For example, the security application 114a may send from the network device 104, at block 210, the extracted payload data 120 and the security application 114b may receive at the network server 106, at block 212, the extracted payload data 120.

The method 200 may include, at block 214, analyzing, at the network server, the extracted payload data to identify applications executing on the network device that sent or received the monitored TCP and UDP traffic. In some embodiments, the network device may be a cellular device, the network server may be operated by a carrier of a cellular network utilized by the cellular device, and the performing of the analyzing, at block 214, by the second security application may occur whenever the cellular device is connected to the cellular network. In some embodiments, the identifying of the applications executing on the network device, at block 208 and/or 214, may include classifying the applications, such as classifying each application as one or more of: a spyware, a virus, a malware, a worm, a logic bomb, a trapdoor, a Trojan horse, a Remote Admin Trojan (RAT), a malware, a ransomware, a mobile malicious code, a malicious font, and a rootkit. This classifying may be performed using fuzzy matching. For example, the security application 114b may analyze at the network server 106, at block 214, the extracted payload data 120 to identify the applications 112a-112n executing on the network device 104 that sent or received the monitored TCP and UDP traffic 118. In some embodiments, the network device 104 may be a cellular device such as a smartphone, the network server 106 may be operated by a carrier of a cellular network utilized by the smartphone, and the performing of the analyzing, at block 214, by the security application 114b may occur whenever the smartphone is connected to the cellular network. In some embodiments, the performing of the analyzing, at block 214, by the security application 114b executing on the network server 106, instead of performing the analyzing, at block 208, by the security application 114a executing on the network device 104, may reduce power consumption at the network device 104.

The method 200 may include, at blocks 216 and 218, sending, from the network server, and receiving, at the network device, an indication of the identified applications. In some embodiments, the indication may include classifications and/or attributes of the identified applications and/or security policies for the identified applications. In some embodiments, the communication at blocks 210, 212, 216, and 218 may be accomplished using a custom secure communication protocol. For example, the security application 114b may send from the network server 106, at block 216, an indication of the identified applications 112a-112n and the security application 114b may receive at the network device 104, at block 218, the indication of the identified applications 112a-112n.

The method 200 may include, at block 220, taking, at the network device, a security action on the network device based on the identified applications. In some embodiments, the taking, at the network device, of the security action may include one or more of restricting TCP and UDP traffic sent from or received at one or more of the identified applications at the network device and enforcing a security policy on one or more of the identified applications at the network device. For example, the security application 114a may take at the network device 104, at block 220, a security action on the network device 104 based on the identified applications 112a-112n. In this example, if the application 112a is identified as a malware application, the security application 114a may take the security action of restricting the TCP and UDP traffic of the malware application. Similarly, if the application 112n is identified as a file-sharing application that is subject to a security policy to avoid the uploading of confidential files to a file-sharing server, the security application 114a may take the security action of enforcing the security policy on the file-sharing application. In other examples, the security action may include one or more of leak detection and mitigation, third party library/AdLib risk detection and mitigation, ransomware overlay detection and mitigation, malware attack detection and mitigation, and implementation of real-time traffic or URL blocking and/or anti-phishing. In some embodiments, TCP and UDP traffic may be blocked in real-time based on one or more of IP addresses (source and destination), ports (source and destination), host name, exact application, exact application risk level, application category, user, packet payload, and content. In some embodiments, the interception and inspection of all of the TCP and UDP traffic 118 sent from or received at the network device 104 may enable enforcement of fine-grain security policies at the TCP and UDP traffic level, regardless of whether the operating environment is hostile, and regardless of whether the network is trusted or untrusted.

The method 200 may thus be employed, in some embodiments, to identify the applications 112a-112n executing on a network device 104 to enable application-specific control on the network device 104. In some embodiments, the method 200 may enable monitoring and analyzing of TCP and UDP traffic 118 to identify the applications 112a-112n executing on the network device 104 without awareness by the executing applications 112a-112n, without modification of the monitored TCP and UDP traffic 118, and without rerouting the monitored TCP and UDP traffic 118 through another device (e.g., the TCP and UDP traffic 118 is not rerouted through a third-party remote VPN server). Therefore, the method 200 may enable application-specific control on those of the applications 112a-112n that are in need of some security action but with little or no impact on those of the applications 112a-112n that are not in need of any security action.

Although the blocks of the method 200 are illustrated in FIG. 2 as discrete blocks, various blocks may be divided into additional blocks, combined into fewer blocks, reordered, expanded, or eliminated, depending on the desired implementation. For example, in some embodiments, blocks 202-208 or blocks 202-206 and 210-218 may be employed without performing block 220. Also, in some embodiments, block 220 may be performed by a network administrator or other entity that is different from the entity or entities performing the other blocks of the method 200.

Further, it is understood that the method 200 may improve the functioning of a computer system itself. For example, the functioning of the network device 104 of FIG. 1 may itself be improved by the method 200. For example, the network device 104 may be improved by establishing the VPN tunnel 116 through which all the TCP and UDP traffic 118 sent from or received at the network device 104 is routed, monitoring and analyzing the TCP and UDP traffic 118 to identify the applications 112a-112n executing on the network device 104, and then taking application-specific security actions on the network device 104 based on the identified applications 112a-112n. The method 200 may be more effective than conventional methods which are not able to monitor and analyze TCP and UDP traffic to identify applications executing on a network device without awareness by the executing applications, without modification of the monitored TCP and UDP traffic, or without rerouting the monitored TCP and UDP traffic through another device.

Also, the method 200 may improve the technical field of securing network devices. Accurately identifying the applications executing on a network device may enable effective control of the network device, and is an improvement over conventional methods which are unable to accurately identify the applications executing on a network device or are only able to accurately identify the applications executing on a network device by imposing significant overhead on the executing applications or network traffic.

FIG. 3 illustrates an example computer system 300 that may be employed in application identification and control in a network device. In some embodiments, the computer system 300 may be part of any of the systems or devices described in this disclosure. For example, the computer system 300 may be part of the network device 104 or the network server 106 of FIG. 1.

The computer system 300 may include a processor 302, a memory 304, a file system 306, a communication unit 308, an operating system 310, a user interface 312, and a module 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more blocks of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more blocks of the method 200 of FIG. 2. These computer-executable instructions may be included, for example, in the operating system 310, in one or more applications, such as the module 314, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a BLUETOOTH® device, an 802.6 device (e.g., Metropolitan Area Network (MAN)), a WI-FI™ device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300, and may correspond to the operating system 110 of FIG. 1.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The module 314 may be one or more computer-readable instructions stored on one or more non-transitory computer-readable media, such as the memory 304 or the file system 306, that, when executed by the processor 302, is configured to perform one or more blocks of the method 200 of FIG. 2. In some embodiments, the module 314 may be part of the operating system 310 or may be part of an application of the computer system 300, or may be some combination thereof. In some embodiments, the module 314 may function as the security application 114a and/or the security application 114b of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for application identification and control in a network device, at least a portion of the method being performed by a computing device comprising at least one processor, the method comprising:
   establishing, at a network device, a Virtual Private Network (VPN) tunnel through which all Transmission Control Protocol (TCP) and User Datagram Protocol (UDP) traffic sent from or received at the network device is routed;
   monitoring, at the network device, all TCP and UDP traffic sent from or received at the network device through the VPN tunnel;
   extracting, at the network device, payload data from the monitored TCP and UDP traffic;
   analyzing the extracted payload data to identify applications executing on the network device that sent or received the monitored TCP and UDP traffic; and
   taking, at the network device, a security action on the network device based on the identified applications.

2. The method of claim 1, wherein the establishing, at the network device, of the VPN tunnel is performed by a security application executing on the network device using a standard VPN Application Programming Interface (API) of an operating system executing on the network device.

3. The method of claim 2, wherein:
   the operating system is a closed operating system; and
   the standard VPN API is an NEPacketTunnelProvider VPN API.

4. The method of claim 2, wherein the operating system is a closed operating system.

5. The method of claim 1, wherein the analyzing of the extracted payload data is performed at the network device by a security application executing on the network device.

6. The method of claim 1, wherein the monitoring and extracting is performed at the network device without awareness by the identified applications executing on the network device, without modification of the monitored TCP and UDP traffic, and without rerouting the monitored TCP and UDP traffic through another device.

7. A computer-implemented method for application identification and control in a network device, at least a portion of the method being performed by a computing device comprising at least one processor, the method comprising:
   establishing, at a network device, a Virtual Private Network (VPN) tunnel through which all Transmission Control Protocol (TCP) and User Datagram Protocol (UDP) traffic sent from or received at the network device is routed;
   monitoring, at the network device, all TCP and UDP traffic sent from or received at the network device through the VPN tunnel;
   extracting, at the network device, payload data from the monitored TCP and UDP traffic;
   sending, from the network device, and receiving, at a network server, the extracted payload data;
   analyzing, at the network server, the extracted payload data to identify applications executing on the network device that sent or received the monitored TCP and UDP traffic;
   sending, from the network server, and receiving, at the network device, an indication of the identified applications; and taking, at the network device, a security action on the network device based on the identified applications.

8. The method of claim 7, wherein:
the establishing, monitoring, extracting, and taking are performed at the network device by a first security application executing on the network device; and
the analyzing is performed at the network server by a second security application executing on the network server.

9. The method of claim 8, wherein the performing of the analyzing by the second security application executing on the network server reduces power consumption at the network device.

10. The method of claim 8, wherein:
the network device is a cellular device; and
the network server is operated by a carrier of a cellular network utilized by the cellular device.

11. The method of claim 10, wherein the performing of the analyzing by the second security application occurs whenever the cellular device is connected to the cellular network.

12. The method of claim 7, wherein the taking, at the network device, of the security action comprises one or more of:
restricting TCP and UDP traffic sent from or received at one or more of the identified applications at the network device; and
enforcing a security policy on one or more of the identified applications at the network device.

13. The method of claim 7, wherein:
the identifying of the applications executing on the network device further comprises classifying the applications as comprising one or more of: a spyware, a virus, a malware, a worm, a logic bomb, a trapdoor, a Trojan horse, a Remote Admin Trojan (RAT), a malware, a ransomware, a mobile malicious code, a malicious font, and a rootkit; and
the classifying is performed using fuzzy matching.

14. The method of claim 7, wherein the monitoring and extracting is performed at the network device without awareness by the identified applications executing on the network device, without modification of the monitored TCP and UDP traffic, and without rerouting the monitored TCP and UDP traffic through another device.

15. One or more non-transitory computer-readable media comprising one or more computer-readable instructions that, when executed by one or more processors of one or more computing devices, cause the one or more computing devices to perform a method for application identification and control in a network device, the method comprising:
establishing, at a network device, a Virtual Private Network (VPN) tunnel through which all Transmission Control Protocol (TCP) and User Datagram Protocol (UDP) traffic sent from or received at the network device is routed;
monitoring, at the network device, all TCP and UDP traffic sent from or received at the network device through the VPN tunnel;
extracting, at the network device, payload data from the monitored TCP and UDP traffic;
analyzing the extracted payload data to identify applications executing on the network device that sent or received the monitored TCP and UDP traffic; and
taking, at the network device, a security action on the network device based on the identified applications.

16. The one or more non-transitory computer-readable media of claim 15, wherein:
an operating system executing on the network device is a closed operating system; and
the establishing, at the network device, of the VPN tunnel is performed by a security application executing on the network device using a standard VPN Application Programming Interface (API) of the closed operating system executing on the network device.

17. The one or more non-transitory computer-readable media of claim 15, wherein the analyzing of the extracted payload data comprises:
sending, from the network device, and receiving, at a network server, the extracted payload data;
analyzing, at the network server, the extracted payload data to identify the applications executing on the network device that sent or received the monitored TCP and UDP traffic; and
sending, from the network server, and receiving, at the network device, an indication of the identified applications.

18. The one or more non-transitory computer-readable media of claim 17, wherein:
the network device is a cellular device;
the network server is operated by a carrier of a cellular network utilized by the cellular device; and
the performing of the analyzing occurs whenever the cellular device is connected to the cellular network.

19. The one or more non-transitory computer-readable media of claim 15, wherein the taking, at the network device, of the security action comprises one or more of:
restricting TCP and UDP traffic sent from or received at one or more of the identified applications at the network device; and
enforcing a security policy on one or more of the identified applications at the network device.

20. The one or more non-transitory computer-readable media of claim 15, wherein the monitoring and extracting is performed at the network device without awareness by the identified applications executing on the network device, without modification of the monitored TCP and UDP traffic, and without rerouting the monitored TCP and UDP traffic through another device.

* * * * *